(12) United States Patent  
Iida et al.

(10) Patent No.: US 7,677,019 B2
(45) Date of Patent: Mar. 16, 2010

(54) EXHAUST CIRCULATION LAWNMOWER

(75) Inventors: Tetsuo Iida, Saitama (JP); Shunsuke Kurioka, Saitama (JP); Shoji Hasei, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 63 days.

(21) Appl. No.: 11/888,737

(22) Filed: Aug. 2, 2007

(65) Prior Publication Data
US 2008/0028736 A1 Feb. 7, 2008

(30) Foreign Application Priority Data
Aug. 3, 2006 (JP) ............................... 2006-212387

(51) Int. Cl.
*A01D 69/00* (2006.01)
(52) U.S. Cl. ...................................... 56/12.2; 56/320.2
(58) Field of Classification Search ................ 56/320.1, 56/320.2, 400.11, 12.2
See application file for complete search history.

(56) References Cited

U.S. PATENT DOCUMENTS

| 4,413,467 | A | * | 11/1983 | Arizpe | 56/11.3 |
| 4,566,257 | A | * | 1/1986 | Akrabawi | 56/202 |
| 4,631,909 | A | | 12/1986 | McLane | |
| 4,745,735 | A | * | 5/1988 | Katayama | 56/202 |
| 4,848,070 | A | * | 7/1989 | Berglund | 56/202 |
| 4,924,664 | A | * | 5/1990 | Hicks et al. | 56/202 |
| 5,678,399 | A | * | 10/1997 | Baron | 56/320.2 |
| 6,105,350 | A | * | 8/2000 | Vachon et al. | 56/202 |

FOREIGN PATENT DOCUMENTS

JP 61-125223 8/1986

* cited by examiner

*Primary Examiner*—Thomas B Will
*Assistant Examiner*—Mai T Nguyen
(74) *Attorney, Agent, or Firm*—Carrier, Blackman & Associates P.C.; Joseph P. Carrier; William D. Blackman

(57) ABSTRACT

An exhaust circulation lawnmower is disclosed in which grass clippings are sent, along with carrier air, from a cutter housing to a grass bag; the grass clippings are held in the grass bag; and the carrier air is returned to the cutter housing as exhaust. A surface area $A_1$ of a grass clippings discharge opening and a surface area $A_2$ of a recirculation opening have a relationship of $A_2 \leq \{1/(1-\beta N)^{0.5}\}A_1$, where $A_1$ is the surface area of the grass clippings discharge opening through which the grass clippings and carrier air are discharged from the cutter housing to the grass bag, $A_2$ is the surface area of the recirculation opening through which the carrier air is recirculated from the grass bag to the cutter housing, N is the number of bends having an angle of α degrees in the space between the grass clippings discharge opening and the recirculation opening, and β is a pressure loss coefficient for each of the bends.

19 Claims, 7 Drawing Sheets

EXHAUST CIRCULATION LAWNMOWER

FIELD OF THE INVENTION

The present invention relates to an improvement in an exhaust circulation lawnmower in which grass clippings are sent, along with carrier air, from a cutter housing to a grass bag, the grass clippings are held in the grass bag, and the carrier air is returned to the cutter housing as exhaust.

BACKGROUND OF THE INVENTION

In general, in a lawnmower, a cutter blade is made to rotate in a cutter housing, grass is cut by the cutter blade, and grass clippings are carried to a grass bag by air (carrier air) generated by the cutter blade.

After delivering the grass clippings to the grass bag, the carrier air passes through the grass bag and is discharged out from the grass bag. The carrier air causes noise and dust to be produced, and causes discomfort to the operator and people in the surrounding area.

A cover is attached to a peripheral edge of the grass bag in order to reduce dust. However, the carrier air is completely discharged from the grass bag, and discharged toward the area in which the operator is working. Attaching the cover is not a sufficiently effective countermeasure.

If the carrier air is returned to the cutter housing without being discharged from the grass bag, the total amount of the carrier air discharged from the grass bag will decrease. Such a system can effectively minimize dust.

Such an exhaust circulation lawnmower is known from U.S. Pat. No. 4,631,909 and Japanese Utility Model Laid-Open Publication No. 61-125223. In the exhaust circulation lawnmower, grass clippings are conveyed along with carrier air from a cutter housing to a grass bag, the grass clippings are left in the grass bag, and only the carrier air is recirculated to the cutter housing as exhaust.

Referring now to FIG. 8 hereof, discussion will be made as to the exhaust circulation lawnmower disclosed in U.S. Pat. No. 4,631,909.

An exhaust circulation lawnmower 200 shown in FIG. 8 comprises a cutter housing 201 that rotatably accommodates a cutter blade (not shown); a grass bag 202 that is provided to a rear of the cutter housing 201 and that stores the grass clippings; a grass clippings conveyance channel 203 that is provided to the cutter housing 201 and that is used to convey the grass clippings along with the carrier air from the cutter housing 201 to the grass bag 202; and an exhaust-recirculation channel 204 that is provided to the cutter housing 201 and that is used to recirculate the carrier air as exhaust from the grass bag 202 to the cutter housing 201 once the grass clippings have been held in the grass bag 202.

However, there is no mention of a ratio in the exhaust circulation lawnmower 200 between surface areas of a grass clippings discharge opening 205 that is provided to the grass bag 202 side of the grass clippings conveyance channel 203 and that is used to discharge, along with the carrier air, the grass clippings to the grass bag 202; and of a recirculation opening 206 that is provided to a grass bag 202 side of the exhaust-recirculation channel 204 and that is used to recirculate only the exhaust from the grass bag 202.

In other words, there exists a demand for a technique whereby, in an exhaust circulation lawnmower, when a grass clippings discharge opening is set to a predetermined size, a recirculation opening is provided for the carrier air at a size at which a predetermined capacity for grass clippings can be maintained without instances of the carrier air stopping in the grass clippings conveyance channel and grass bag.

SUMMARY OF THE INVENTION

It is therefore an object of the present invention to provide a technique for resolving the problem of lack of consistency between surface areas of a grass clippings discharge opening and a recirculation opening of an exhaust circulation lawnmower being of indeterminate sizes, whereby it is possible to set the recirculation opening to a size that is optimal in relation to the size of the grass clippings discharge opening.

According to the present invention, there is provided an exhaust circulation lawnmower in which grass clippings are sent, along with carrier air, from a cutter housing to a grass bag, the grass clippings are held in the grass bag, and the carrier air is then returned to the cutter housing as exhaust, the exhaust circulation lawnmower comprising: the cutter housing to which a cutter blade for cutting grass is rotatably provided; and the grass bag that is provided rearward of the cutter housing and is used to store the grass clippings, wherein a surface area $A_1$ of a grass clippings discharge opening and a surface area $A_2$ of a recirculation opening have a relationship of $A_2 \leq \{1/(1-\beta N)^{0.5}\}A_1$, where $A_1$ is the surface area of the grass clippings discharge opening through which the grass clippings and carrier air are discharged from the cutter housing to the grass bag, $A_2$ is the surface area of the recirculation opening through which the carrier air is recirculated from the grass bag to the cutter housing, N is a number of bends having an angle of $\alpha$ degrees in the space between the grass clippings discharge opening and the recirculation opening is N, and $\beta$ is a pressure loss coefficient for each of the bends.

In general, the flow of a fluid over a certain cross-sectional area can be expressed by the product of a cross-sectional area and the flow rate. Therefore, the flow of the grass clippings discharge opening is expressed by $A_1$ multiplied by the flow rate of the grass clippings discharge opening. The flow of the recirculation opening can be expressed by $A_2$ multiplied by the flow rate of the recirculation opening. If it is assumed that the carrier air does not leak in the area between the grass clippings discharge opening and the recirculation opening, then, due to the continuity principle, whereby the amount of flow in the upstream and downstream directions is constant, the flows passing through the grass clippings discharge opening and the recirculation opening will be equal. However, the carrier air must be bent at least once in order to be returned from the grass bag, which is provided to the rear of the cutter housing, to the cutter housing. Bending will lower the fluid velocity.

Therefore, a relationship of $A_2 \leq \{1/(1-\beta N)^{0.5}\}A_1$ is established between the surface area $A_1$ of the grass clippings discharge opening and the surface area $A_2$ of the recirculation opening when a number of bending parts having an angle of $\alpha$ between the grass clippings discharge opening and the recirculation opening is N, and a pressure loss coefficient for each of the bending parts is $\beta$.

Therefore, increases in the resistance to the recirculating of the carrier air can be minimized, and the carrier air can be smoothly returned to the cutter housing. As a result, benefits are presented in that the exhaust is smoothly circulated, the grass clippings and carrier air are prevented from stopping, and the capacity for grass clippings can be improved.

The surface area of the recirculation opening can also be prevented from being set at an unnecessarily large size in relation to the surface area of the grass clippings discharge opening. As a result, a benefit is presented in that the cutter housing and grass bag can be prevented from being made larger.

BRIEF DESCRIPTION OF THE DRAWINGS

A preferred embodiment of the present invention will be described in detail below, by way of example only, with reference to the accompanying drawings, in which.

DESCRIPTION OF THE PREFERRED EMBODIMENT

Figure 1:
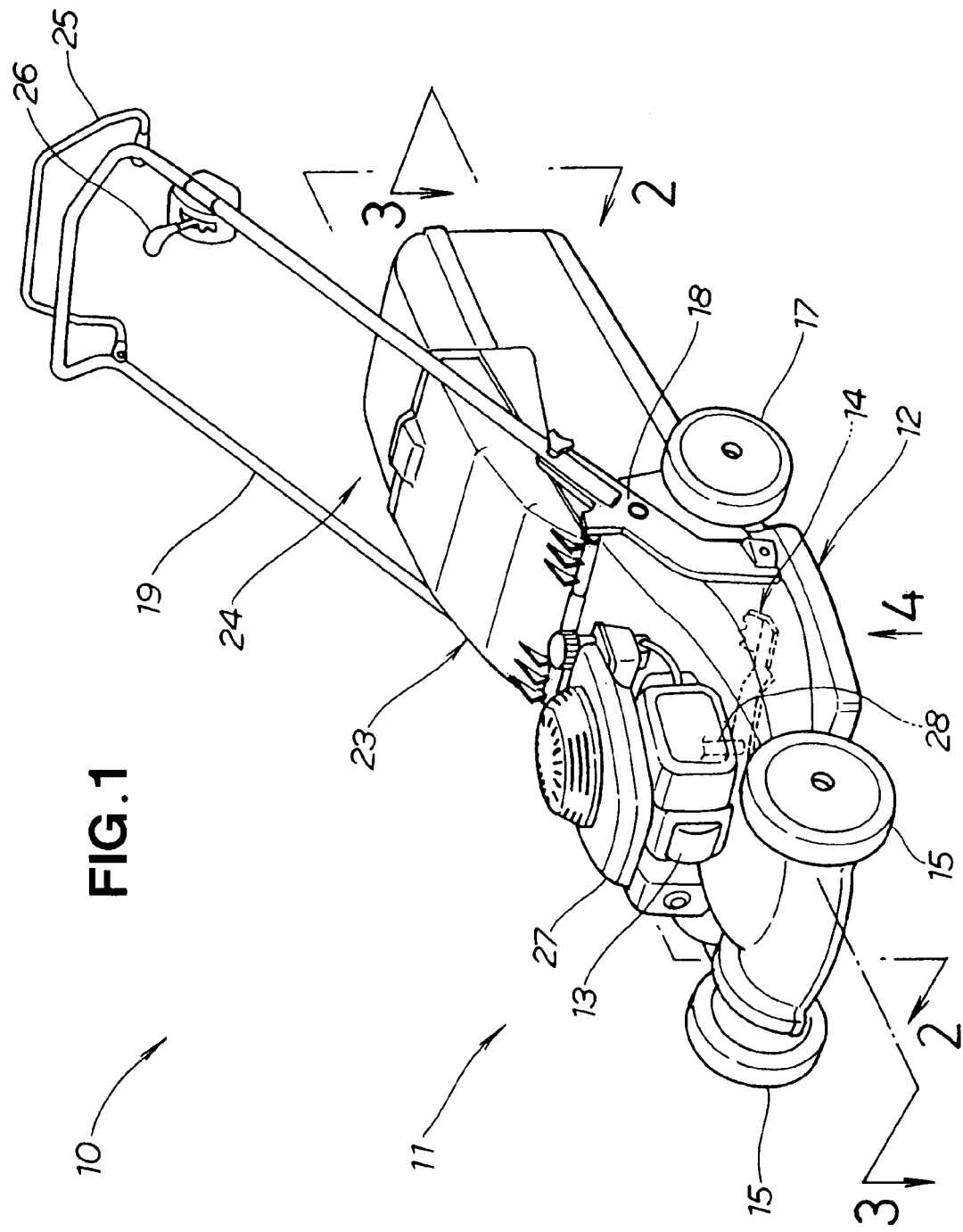
FIG. 1 is a perspective view showing an exhaust circulation lawnmower according to the present invention.
Figure 2:
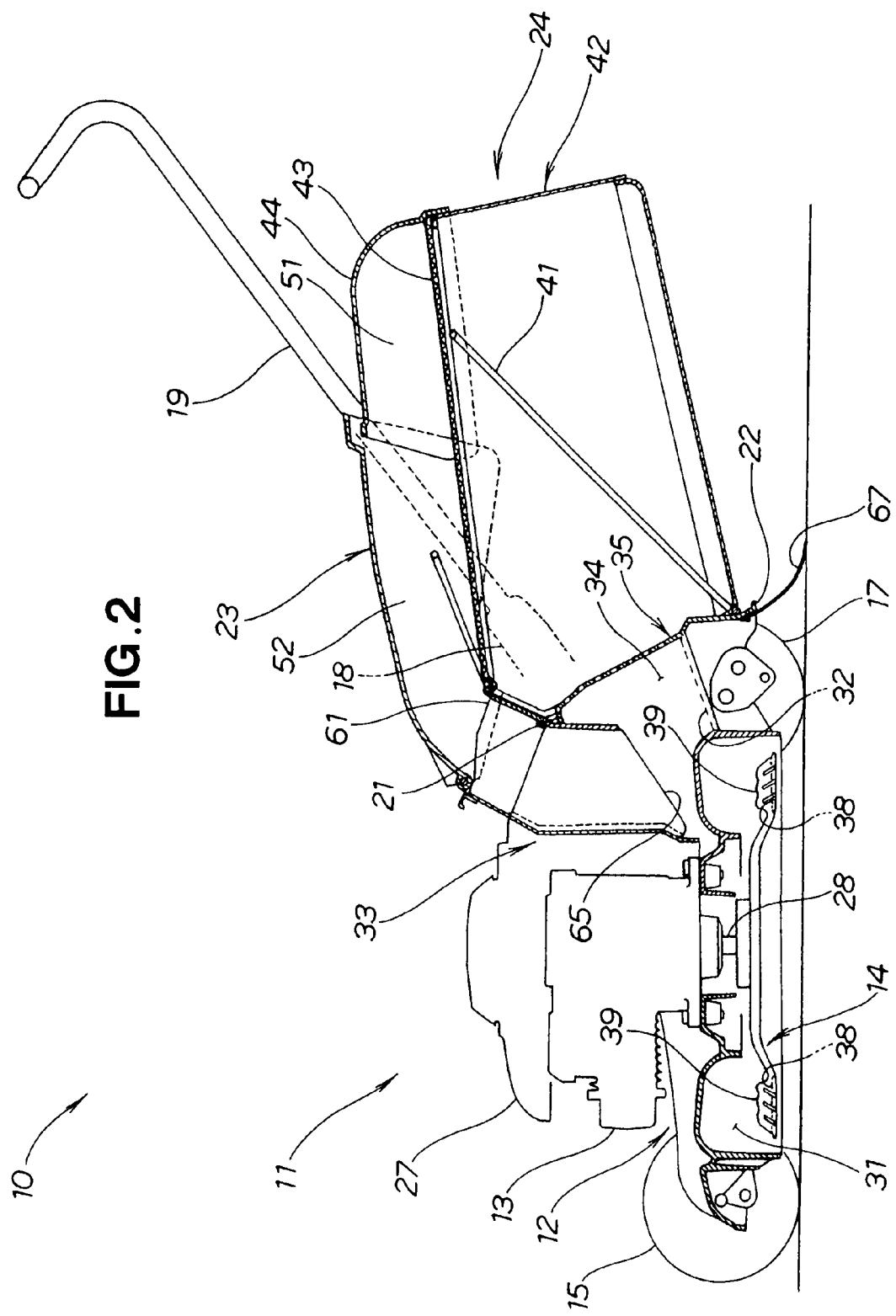
FIG. 2 is a cross-sectional view taken along line 2-2 of FIG. 1.
Figure 3:
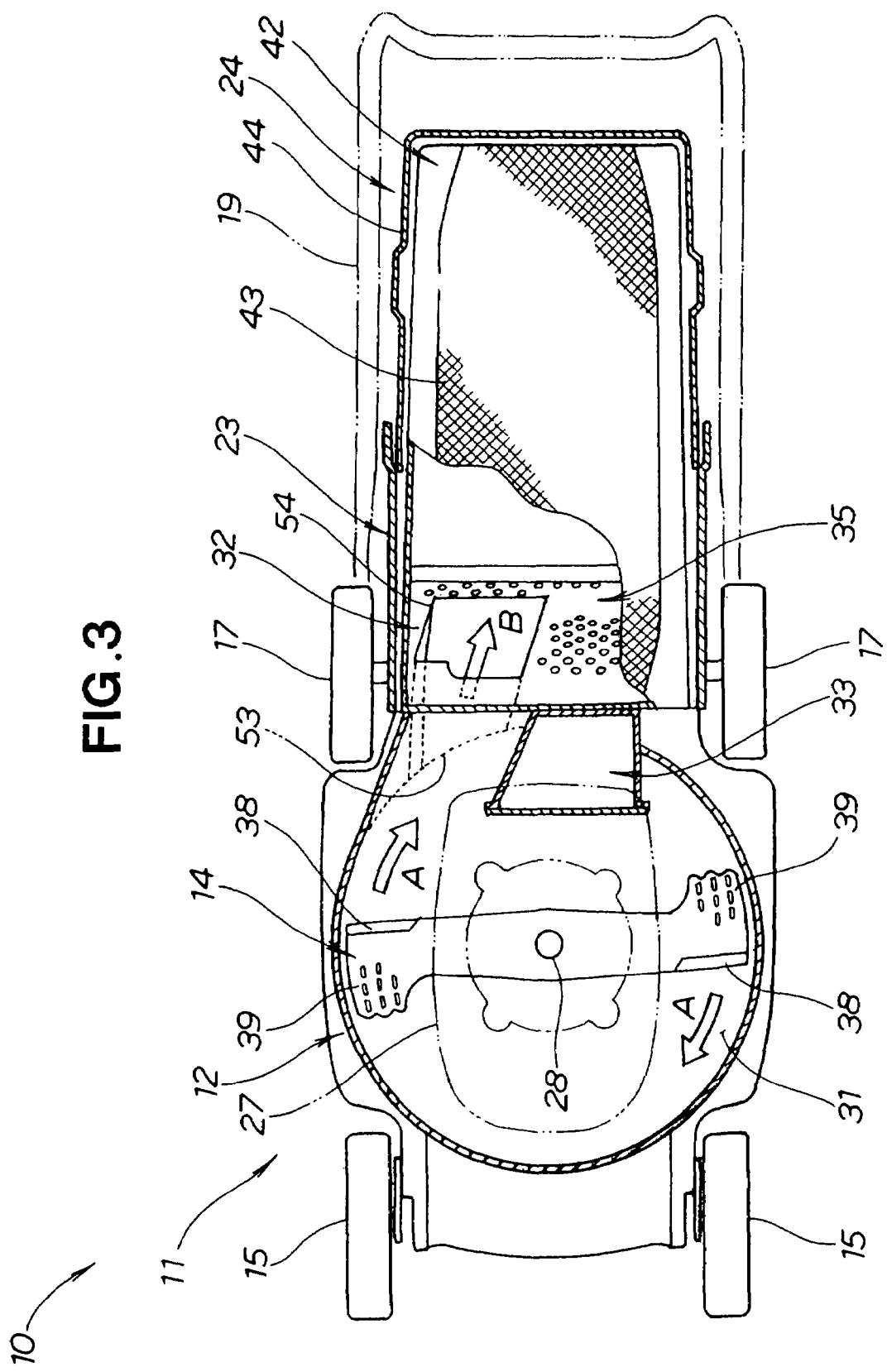
FIG. 3 is a cross-sectional view taken along line 3-3 of FIG. 1.

As shown in FIGS. 1 through 3, an engine 13 is mounted on an upper part of a cutter housing 12 in an exhaust circulation lawnmower 10. The engine 13 is covered by a head cover 27, and a cutter blade 14 is attached to a rotating shaft 28 extending from the engine 13 in an interior of the cutter housing 12. The cutter blade 14 is made to rotate by the engine 13, grass (see FIG. 7) is cut and carrier air for conveying grass clippings is generated, and the cut grass clippings are sent along with the carrier air from the cutter housing (cutter deck) 12 to a grass bag 24 provided to a rear of the cutter housing 12. The grass clippings are stored in the grass bag 24, and the carrier air that has conveyed the grass clippings is returned from the grass bag 24 to the cutter housing 12 as exhaust.

Figure 4:
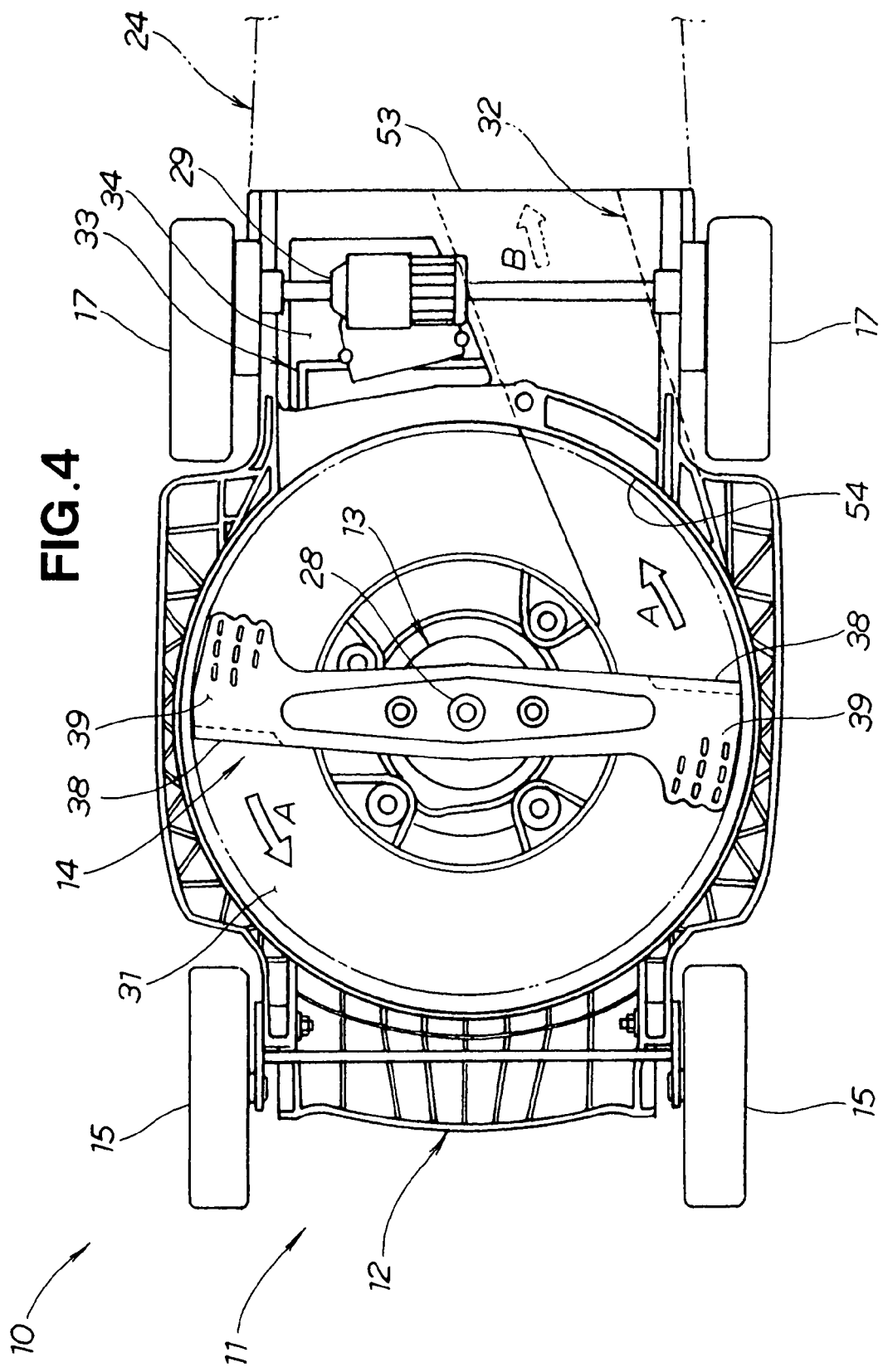
FIG. 4 is a view as seen from arrow 4 of FIG. 1.

In the exhaust circulation lawnmower 10, the rotation of the engine 13 is transmitted to rear wheels 17, 17 via a movement transmitting part 29 (FIG. 4). The exhaust circulation lawnmower is a self-propelled lawnmower in which the rear wheels 17, 17 are driven by the engine 13.

The cutter housing 12 is a member forming a core of a machine body 11. The cutter housing comprises a scroll part 31 that allows the rotation of the cutter blade and that surrounds the cutter blade 14; a grass clippings conveyance channel 32 that extends rearward from the scroll part 31 and that conveys the grass clippings (cut grass) along with the carrier air to the grass bag 24; an exhaust-recirculation channel 33 that is provided to an upper surface 21 of a rear part of the cutter housing 12 and that is used to recirculate only the exhaust (carrier air) to the cutter housing 12 while leaving only the conveyed grass clippings in the grass bag 24; and a cavity 34 in which the exhaust-recirculation channel 33 is oriented toward a lower end 22 of the rear part of the cutter housing 12.

The machine body 11 is composed of the cutter housing 12, engine 13, and head cover 27.

In the cutter housing 12, front wheels 15, 15 are rotatably attached to the left and right front sides, and the rear wheels 17, 17 that are driven by the engine 13 are rotatably attached to the left and right rear sides. A discharge guard (grass cover) 23 for releasing grass clippings to disperse them on the grass L, is oscillatably attached rearward of the upper part of the cutter housing 12. An exhaust guard 67 for preventing the exhaust from escaping and for directing the exhaust toward the cutter housing 12 is provided to the lower end 22 of the rear part. Handle stays 18, 18 are provided to an upper part on the right and left of a rear part. A substantially U-shaped handle 19 extends from the handle stays 18, 18. A cutter lever 25 for operating the cutter blade 14 is provided to a U-shaped portion of the handle 19, and a gear shift lever 26 for adjusting the velocity of the vehicle body 11 is provided to one side of the handle 19.

The exhaust guard 67 can improve the efficiency of exhaust circulation (exhaust recirculating). As a result, sufficient reductions in noise and dirt can be achieved, and the work environment can be better preserved.

The grass L is cut using the cutter blade 14, and the scroll part 31 is an enclosure for sending the cut grass clippings to the grass bag 24.

The grass clippings conveyance channel 32 is a channel that extends rearward from the scroll part 31 and is formed on one side of the scroll part 31. A channel inlet 53 is formed on the scroll part 31 side of the cut grass conveyance channel, and a grass clippings discharge opening 54 is formed on a rear wall 35 (grass bag 24 side) of the cutter housing 12.

The exhaust-recirculation channel 33 is a channel that is adjacent to and substantially perpendicular to the grass clippings conveyance channel 32. In the exhaust-recirculation channel, a recirculation opening 61 for returning the exhaust to the cutter housing 12 is formed on an upper end, and an exhaust opening 65 through which the exhaust is discharged is formed on a lower end.

The grass bag 24 is a substantially rectangular-solid-shaped member that is detachably attached to the rear wall 35 of the cutter housing 12. The grass bag comprises a frame body 41 attached to the cutter housing 12; a grass holding part 42 that is attached to the frame body 41 and that is formed by a member impermeable to air in order to hold the grass clippings; a reticulated member 43 formed by an air-permeable member provided to an upper surface of the grass clippings holding part 42; and an air-impermeable cover member 44 that forms an open space on an upper part of the reticulated member 43 and that is open at the front and blocked at the rear.

A first exhaust path 51 is a channel for guiding the exhaust to the recirculation opening 61. The first exhaust path is formed by the cover member 44 of the grass bag 24 and a rear part of the upper surface of the reticulated member 43.

A second exhaust path 52 is provided to the first exhaust path 51 in continuous fashion and is a channel connected to the recirculation opening 61. The second exhaust path is formed by the discharge guard 23 and a front part of the upper surface of the reticulated member 43 of the grass bag 24.

The cutter blade 14 is composed of blade parts 38, 38 formed in a region positioned at a front side in relation to a rotation direction, which is indicated by hollow arrows A, A; and airlift parts 39, 39 that bend upward from the blade parts 38, 38 to a region positioned on a rear side in the rotation direction, as shown in FIGS. 3 and 4.

In other words, in the exhaust circulation lawnmower 10, the cutter blade 14 is made to rotate, whereby the grass L on a ground surface is lifted by negative pressure generated by lower surfaces of the airlift parts 39, 39. The grass is cut by the blade parts 38, 38. The cut grass clippings are struck by upper surfaces of the air lift parts 39, 39, and caught in a rotating flow created by the rotation of the cutter blade 14. The rotating flow acts as carrier air, and the grass is sent along with the carrier air to the grass bag 24 as indicated by the hollow arrow B.

The flow of the carrier air and grass clippings in the grass bag 24 shall be described next.

Figure 5:
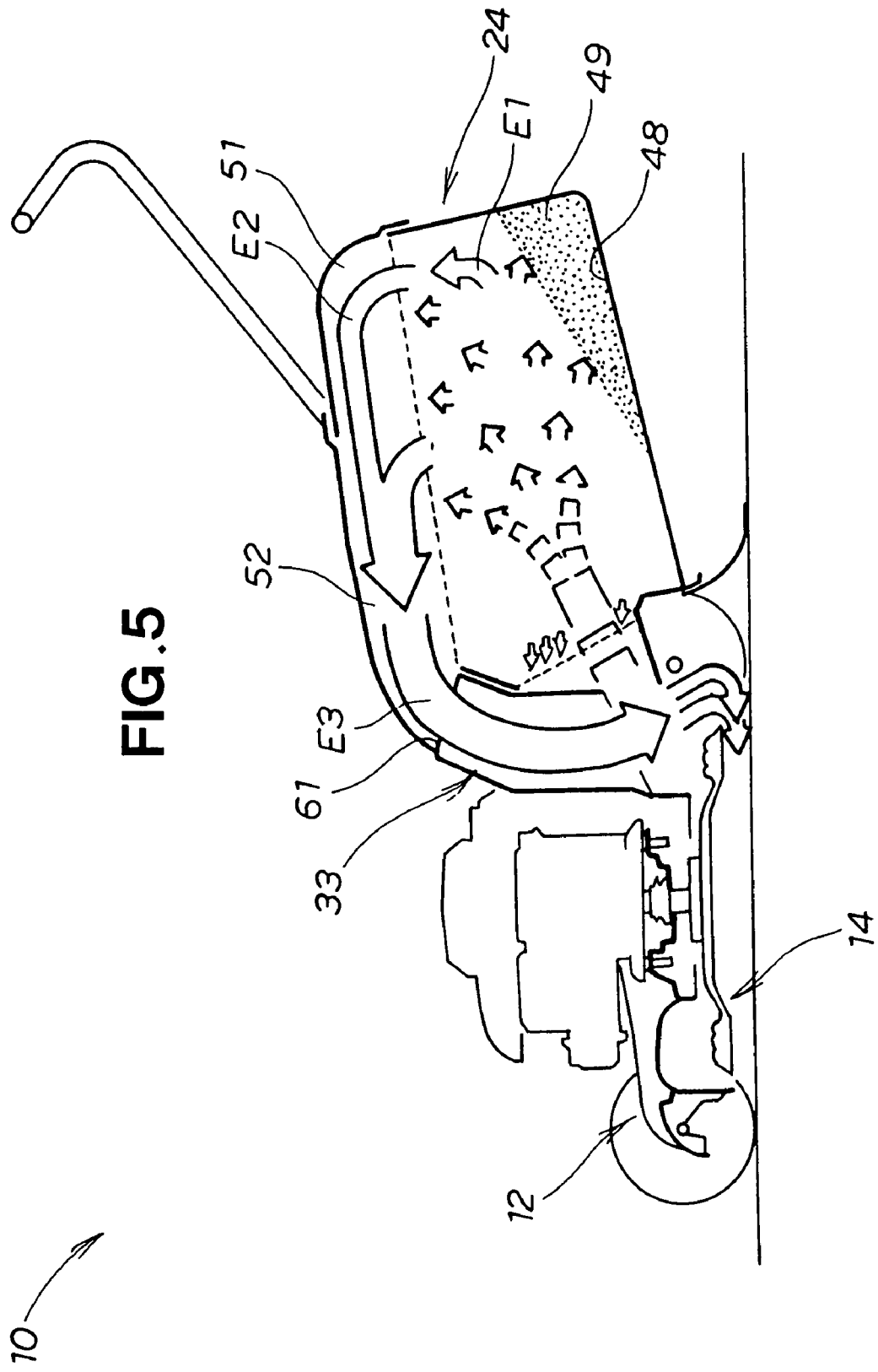
FIG. 5 is a side view showing the flow of carrier air and grass clippings in the exhaust circulation lawnmower shown in FIG. 1.
Figure 6:
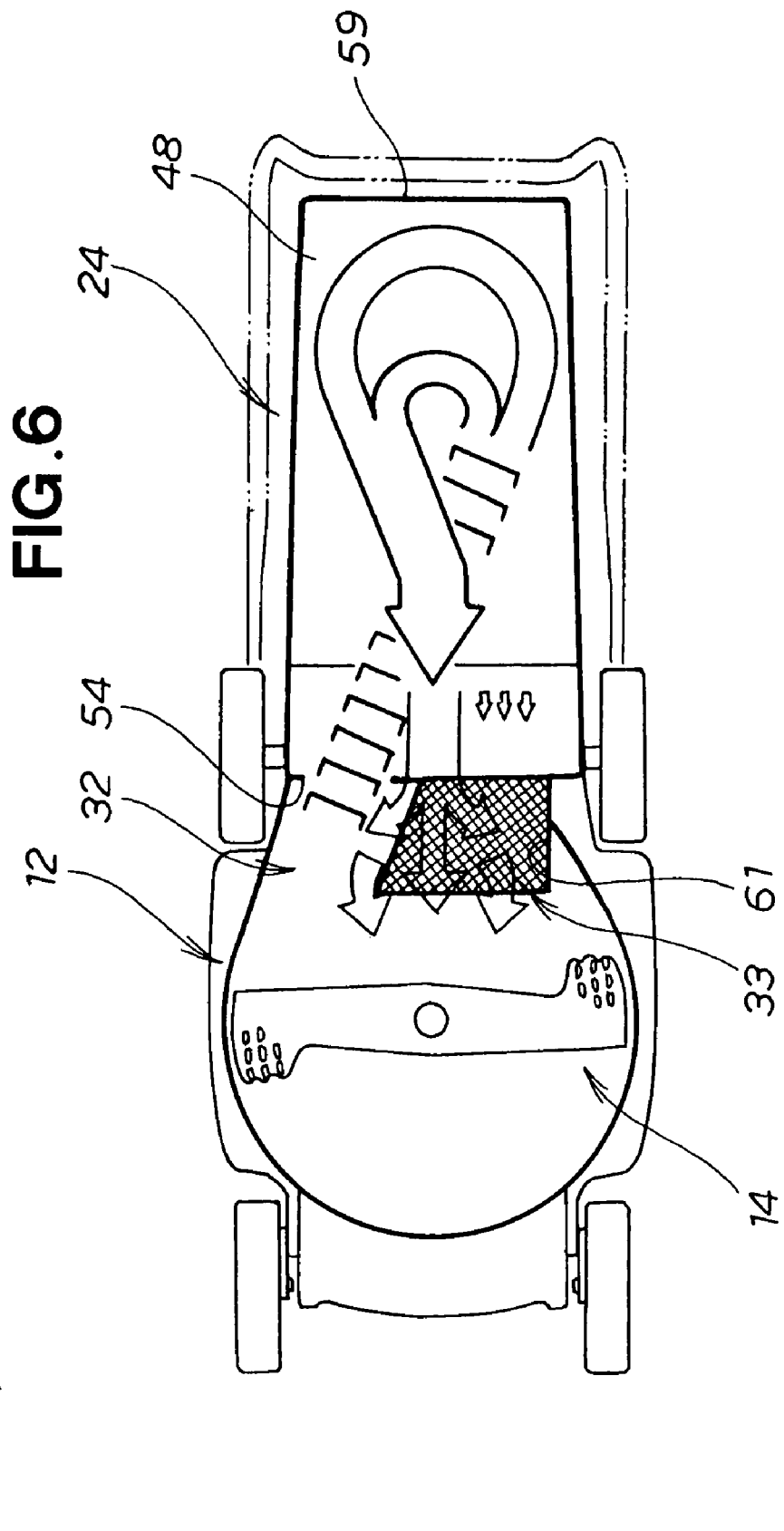
FIG. 6 is a top plan view showing the flow of carrier air and grass clippings in the exhaust circulation lawnmower shown in FIG. 1.

FIG. 5 is a side view showing the flow of the carrier air and grass clippings in the exhaust circulation lawnmower shown in FIG. 1. FIG. 6 is a plan view showing the flow of the carrier air and grass clippings in the exhaust circulation lawnmower shown in FIG. 1.

The flow of grass clippings 49 and carrier air in a side view of the grass bag 24 shall be described below. The grass clippings 49 discharged from the grass clippings discharge opening 54 (FIG. 6) to the grass bag 24 accumulate at the bottom 48 of the grass bag 24; and the carrier air flows to the recirculation opening 61 via the first and second exhaust paths 51, 52 formed on the upper part of the grass bag 24, as shown in FIG. 5. It is believed that three substantially 90 degree bends are present as indicated by E1 through E3.

The flow of the grass clippings 49 and carrier air, as viewed from above the grass bag 24, turns at a rear end part 59 of the grass bag, as shown in FIG. 6. The grass clippings 49 accumulate at the bottom 48 of the grass bag 24 before the turn, and the carrier air that has turned is recirculated to the cutter housing 12 as exhaust.

In the exhaust circulation lawnmower 10, the opening surface areas (referred to below as "surface areas") of the grass clippings discharge opening 54 and the recirculation opening 61 are optimally set, whereby the grass clipping capacity can be improved and instances of the exhaust circulation lawnmower 10 being designed larger than necessary can be avoided. A formula is accordingly demanded for making it possible to set the optimal sizes for the grass clippings discharge opening 54 and the recirculation opening 61.

Figure 7:
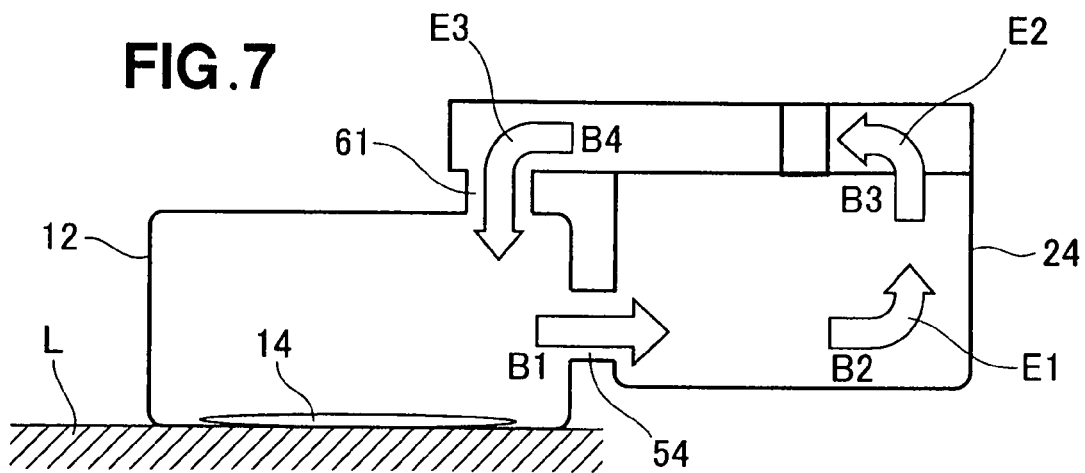
FIG. 7 is a schematic view showing the flow of carrier air in the exhaust circulation lawnmower shown in FIG. 1.
Figure 8:
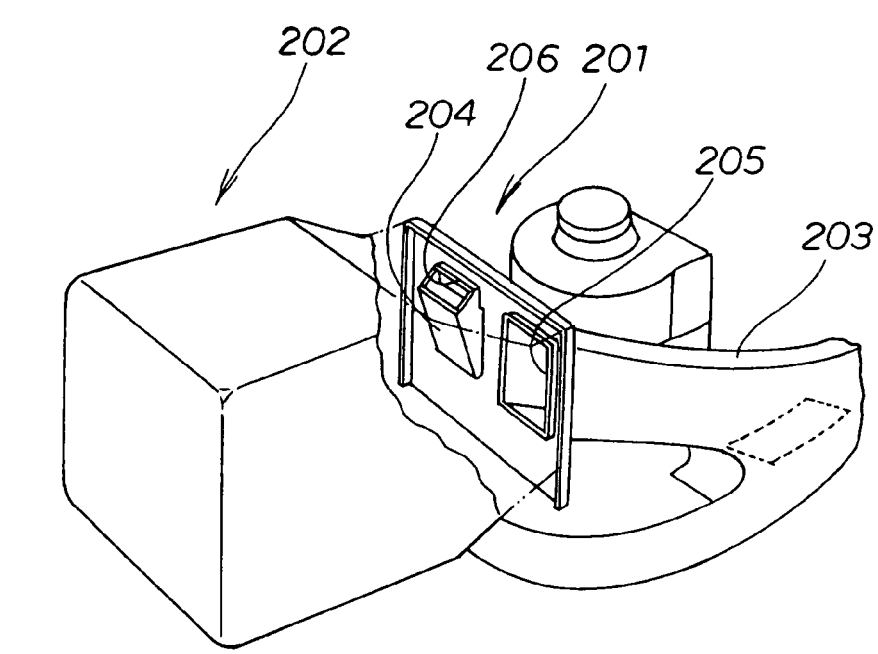
FIG. 8 is a schematic view of a conventional exhaust circulation lawnmower.

FIG. 7 is a schematic view of the exhaust circulation lawnmower shown in FIG. 1

It is believed that the surface area of the exhaust-recirculation channel is preferably made large in order to minimize resistance to the passage of recirculated air. However, in actual practice, limitations are imposed by the balance of the overall lawnmower and other functions/component parts, and it is impossible to increase the size by emphasizing the surface area of the recirculation opening and merely increasing the surface area. Therefore, a required minimum limit for the surface area of the recirculation opening in relation to the surface area of the grass clippings discharge opening shall be considered for the exhaust circulation lawnmower.

The flow of the carrier air from the grass clippings discharge opening to the recirculation opening is indicated by arrows B1 through B4. The surface area of the grass clippings opening is $A_1$, the velocity at the grass clippings discharge opening is $V_1$, the surface area of the recirculation opening is $A_2$, and the velocity at the recirculation opening is $V_2$.

The concept of energy continuity for the grass clippings discharge opening and recirculation opening can be expressed in the following manner by using the Bernoulli equation:

$$1/2 \times \gamma \times V_1^2 + P_1 + H_1 = 1/2 \times \gamma \times V_2^2 + P_2 + H_2 \qquad (1)$$

$\gamma$ indicates the density of the fluid, $1/2 \times \gamma \times V_1^2$ and $1/2 \times \gamma \times V_2^2$ indicate dynamic pressure, $P_1$ and $P_2$ indicate static pressure, and $H_1$ and $H_2$ indicate the head (potential energy).

The carrier air has a low specific gravity. Therefore, variations in the head can be ignored. The static pressure can also be excluded because the pressure level (static pressure) of the carrier air is low.

Bending parts of an angle $\alpha$ (in the embodiment, bending parts having a 90 degree angle) are present at N number of places (3 places in the embodiment) along the flow (in the area between the grass clippings discharge opening and the recirculation opening). Therefore, losses at the bending parts are to be considered. A pressure loss coefficient for each of the bending parts having the angle $\alpha$ (referred to below as "pressure loss coefficient") shall be $\beta$.

With the above taken into consideration, formula (1) can be represented as:

$$1/2 \times \gamma \times V_1^2 = 1/2 \times \gamma \times V_2^2 + 1/2 \times \gamma \times V_2^2 \times \beta \times N \qquad (2)$$

Therefore, in formula (2):

$$V_2 = (1 - \beta N)^{0.5} V_1 \qquad (3)$$

In other words, as a result of loss due to the bending parts, the flow rate at the recirculation opening decreases by about $(1 - \beta N)^{0.5}$ of the flow rate at the grass clippings discharge opening.

For example, if the loss coefficient $\beta$ due to the 90-degree bending parts is set at $C_{90} = 0.21$, then $V_2 = 0.61 V_1$. The flow rate at the recirculation opening is believed to decrease to a flow rate that is about 60% of that at the grass clippings discharge opening.

The loss coefficient of $C_{90} = 0.21$ is in accordance with paragraphs 2 and 3 (loss coefficient of a bend) on page 73 of *Exercise of Fluid Mechanical Engineering* (published by Gakkensha) by Teruyuki Maeda. A Table 1 is reproduced below.

TABLE 1

Loss Coefficient of a Bend

| Wall surface | (θ°) | R/d | | | | |
| --- | --- | --- | --- | --- | --- | --- |
| | | 1 | 2 | 4 | 6 | 10 |
| Smooth | 15 | 0.03 | 0.03 | 0.03 | 0.03 | 0.03 |
| | 45 | 0.14 | 0.09 | 0.08 | 0.08 | 0.07 |
| | 60 | 0.19 | 0.12 | 0.095 | 0.085 | 0.07 |
| | 90 | 0.21 | 0.135 | 0.10 | 0.085 | 0.105 |
| Rough | 90 | 0.51 | 0.30 | 0.23 | 0.18 | 0.20 |

In Table 1, $\theta$ is the angle of the bend, R is the radius of the bend, and d is the diameter of the channel.

Taking Q to be the flow amount (amount of air) at the upstream and downstream (the grass clippings discharge opening and recirculation opening), then making the flow amount Q constant, and applying the continuity principle gives $$Q = V_1 A_1 = V_2 A_2 \qquad (4)$$

In other words, $A_2 = (V_1/V_2) A_1$ \qquad (5)

Therefore, a substitution of formula (3) into formula (5) can be expressed as:

$$A_2 = (1/(1 - \beta N)^{0.5}) A_1 \qquad (6)$$

It is apparent from formula (6) that the surface area $A_2$ of the recirculation opening is suitably about $1/(1 - \beta N)^{0.5}$ times the surface area $A_1$ of the grass clippings discharge opening.

In the embodiment, $\beta = 0.21$ and $N = 3$. Therefore, $A_2 = 1.64 A_1$.

In an actual exhaust circulation lawnmower, complete recirculating is impossible. This is due to the characteristics of the machine used to cut the grass L, and due to the fact that outside air inevitably enters and exits between the grass L and the lawnmower. In addition, air leakage will occur to some extent between the component parts. Therefore, in actual conditions, loss occurs due to leakage along the channel.

Therefore, formula (6) is expressed as:

$$A_2 \leq (1/(1-\beta N)^{0.5})A_1 \quad (7)$$

In the embodiment, $A_2 \leq 1.64 A_1$.

In other words, in the exhaust circulation lawnmower, the surface area $A_2$ of the recirculation opening should be set to less than or equal to $1/(1-\beta N)^{0.5}$ times the surface area $A_1$ of the grass clippings discharge opening.

As shown in FIGS. 5 and 6, in the exhaust circulation lawnmower, a relationship of $A_2 \leq \{1/(1-\beta N)^{0.5}\}A_1$ is established, where $A_1$ is the surface area of the grass clippings discharge opening 54 through which the grass clippings and carrier air are discharged from the cutter housing 12 to the grass bag 24, $A_2$ is the surface area of the recirculation opening 61 through which the carrier air is recirculated from the grass bag 24 to the cutter housing 12, N is the number of bends having an angle of α degrees in the space between the grass clippings discharge opening 24 and the recirculation opening 61, and β is a pressure loss coefficient for each of the bends. Therefore, increases in the resistance to the recirculating of the carrier air can be minimized, and the carrier air can be smoothly returned from the grass bag 24 to the cutter housing 12. As a result, the exhaust can be smoothly circulated, instances of the grass clippings and carrier air stopping can be eliminated, and the capacity for grass clippings can be improved. Furthermore, the grass can be efficiently cut.

In the exhaust circulation lawnmower 10, a relationship is established between the surface area of the recirculation opening 61 and the surface area of the grass clippings opening 54 such that $$A_2 \leq (1/(1-\beta N)^{0.5})A_1$$

Therefore, instances of the surface area of the recirculation opening 61 being made larger than necessary in relation to the surface area of the grass clippings discharge opening 54 can be avoided. As a result, the cutter housing 12 and grass bag 24 can be prevented from becoming larger.

In the exhaust circulation lawnmower according to the present invention, the relationship between the surface area of the grass clippings discharge opening and the surface area of the recirculation opening was prescribed as shown in FIG. 7. However, this is not offered as a limitation. The surface area of the grass clippings discharge opening may be the cross-sectional area of the grass clippings conveyance channel, and the surface area of the recirculation opening may be the cross-sectional area of the exhaust recirculation channel.

The exhaust circulation lawnmower according to the present invention is suitable for use in a self-propelled lawnmower that can be used in a relatively narrow space.

Obviously, various minor changes and modifications of the present invention are possible in light of the above teaching. It is therefore to be understood that within the scope of the appended claims the invention may be practiced otherwise than as specifically described.

What is claimed is:

1. An exhaust circulation lawnmower in which grass clippings are sent, along with carrier air, from a cutter housing to a grass bag, the grass clippings are held in the grass bag, and the carrier air is then returned to the cutter housing as exhaust, the exhaust circulation lawnmower comprising:
    the cutter housing to which a cutter blade for cutting grass is rotatably provided; and
    the grass bag provided rearwardly of the cutter housing for storing the grass clippings, wherein a surface area $A_1$ of a grass clippings discharge opening of the housing and a surface area $A_2$ of a recirculation opening of the housing have a relationship wherein $A_2$ is $\{1/(1-\beta N)^{0.5}\}$ $A_1$ based on complete recirculation of the carrier air and excluding consideration of entry of outside air into the lawnmower, where $A_1$ is the surface area of the grass clippings discharge opening through which the grass clippings and carrier air are discharged from the cutter housing to the grass bag, $A_2$ is the surface area of the recirculation opening through which the carrier air is recirculated from the grass bag to the cutter housing, N is a number of bends having an angle of α degrees in the space between the grass clippings discharge opening and the recirculation opening, and β is a pressure loss coefficient for each of the bends.

2. The exhaust circulation lawnmower according to claim 1, wherein $A_2$ is also larger than $A_1$.

3. The exhaust circulation lawnmower according to claim 1, wherein the cutter blade includes at least one blade part formed in a region positioned at a front side in relation to a rotation direction, and at least one airlift part, bent upward from the blade part, formed in a region positioned on a rear side in relation to the rotation direction.

4. The exhaust circulation lawnmower according to claim 1, further comprising a discharge guard swingably attached to the cutter housing and covering upper parts of the cutter housing and the grass bag.

5. The exhaust circulation lawnmower according to claim 1 further comprising an exhaust guard provided to a lower end of a rear part of the cutter housing for preventing the carrier air from escaping and for directing the carrier air toward the cutter housing.

6. The exhaust circulation lawnmower according to claim 1, further comprising:
    an exhaust recirculation channel which extends toward a rear part of the cutter housing and discharges the carrier air rearwardly and downwardly such that the carrier air flows beneath the cutter blade.

7. The exhaust circulation lawnmower according to claim 1, wherein the grass bag comprises:
    a frame body attached to the cutter housing;
    a grass clippings holding part, formed by an air-impermeable member, for holding the grass clippings;
    an air-permeable reticulated member provided to an upper surface of the grass clippings holding part for separating the carrier air from the grass clippings; and
    a cover member that forms an open space on an upper part of the reticulated member and that is open at a front and blocked at a rear.

8. The exhaust circulation lawnmower according to claim 1, further comprising:
    a reticulated member within the grass bag for separating the carrier air from the grass clippings;
    a discharge guard covering upper parts of the cutter housing and the grass bag; and
    an exhaust recirculation channel provided in the cutter housing and that is used to recirculate only the carrier air to the cutter housing, wherein
    the grass bag, the reticulated member, the discharge guard, and the exhaust recirculation channel define a flow path for the carrier air from the discharge opening to the recirculation opening.

9. The exhaust circulation lawnmower according to claim 1, wherein the number of bends N is three.

10. An exhaust circulation lawnmower in which grass clippings are sent, along with carrier air, from a cutter housing to a grass bag, the grass clippings are held in the grass bag, and the carrier air is then returned to the cutter housing as exhaust, the exhaust circulation lawnmower comprising:

the cutter housing to which a cutter blade for cutting grass is rotatably provided;

an engine for rotating the cutter blade;

a plurality of wheels, wherein at least one of the plurality of wheels is driven by the engine; and the grass bag provided rearwardly of the cutter housing for storing the grass clippings, wherein surface area $A_1$ of a grass clippings discharge opening of the housing and a surface area $A_2$ of a recirculation opening of the housing have a relationship wherein $A_2$ is larger than $A_1$ and $A_2$ is $\{1/(1-\beta N)^{0.5}\} A_1$ based on complete recirculation of the carrier air and excluding consideration of entry of outside air into the lawnmower, where $A_1$ is the surface area of the grass clippings discharge opening through which the grass clippings and carrier air are discharged from the cutter housing to the grass bag, $A_2$ is the surface area of the recirculation opening through which the carrier air is recirculated from the grass bag to the cutter housing, N is a number of bends having an angle of α degrees in the space between the grass clippings discharge opening and the recirculation opening, and β is a pressure loss coefficient for each of the bends.

11. The exhaust circulation lawnmower according to claim 10, wherein the cutter blade includes at least one blade part formed in a region positioned at a front side in relation to a rotation direction, and at least one airlift part, bent upward from the blade part, formed in a region positioned on a rear side in relation to the rotation direction.

12. The exhaust circulation lawnmower according to claim 10 further comprising a discharge guard swingably attached to the cutter housing and covering upper parts of the cutter housing and the grass bag.

13. The exhaust circulation lawnmower according to claim 10 further comprising an exhaust guard, provided to a lower end of a rear part of the cutter housing, for preventing the carrier air from escaping and for directing the carrier air toward the cutter housing.

14. The exhaust circulation lawnmower according to claim 10, further comprising:

an exhaust recirculation channel which extends toward a rear part of the cutter housing and discharges the carrier air rearwardly and downwardly such that the carrier air flows beneath the cutter blade.

15. The exhaust circulation lawnmower according to claim 10, wherein the grass bag comprises:

a frame body attached to the cutter housing;

a grass clippings holding part, formed by an air-impermeable member, for holding the grass clippings;

an air-permeable reticulated member provided to an upper surface of the grass clippings holding part for separating the carrier air from the grass clippings; and a cover member that forms an open space on an upper part of the reticulated member and that is open at a front and blocked at a rear.

16. The exhaust circulation lawnmower according to claim 10, further comprising:

a reticulated member within the grass bag for separating the carrier air from the grass clippings;

a discharge guard covering upper parts of the cutter housing and the grass bag; and an exhaust recirculation channel provided in the cutter housing for recirculating the carrier air to the cutter housing, wherein the grass bag, the reticulated member, the discharge guard, and the exhaust circulation channel define a flow path for the carrier air from the discharge opening to the recirculation opening.

17. The exhaust circulation lawnmower according to claim 10, wherein the number of bends N is three.

18. The exhaust circulation lawnmower according to claim 1, wherein the angle α degrees of said bends is in a range of 15 degrees-90 degrees.

19. The exhaust circulation lawnmower according to claim 10, wherein the angle α degrees of said bends is in a range of 15 degrees-90 degrees.

* * * * *